US009108689B1

(12) United States Patent
Shelby et al.

(10) Patent No.: US 9,108,689 B1
(45) Date of Patent: Aug. 18, 2015

(54) PROVISIONS FOR THIRD PARTY ATTACHMENTS

(71) Applicant: Caterpillar Inc., Peoria, IL (US)

(72) Inventors: Jason L. Shelby, East Peoria, IL (US); Jared S. Anderson, Yates City, IL (US); Ronald L. Haskovec, Jr., Chillicothe, IL (US); Terril J. Johnson, Washington, IL (US); James T. Shanklin, Varna, IL (US); Michael M. Conrad, Metamora, IL (US); Gregory J. Parsons, Peoria, IL (US); Kevin L. Welty, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/315,895

(22) Filed: Jun. 26, 2014

(51) Int. Cl.
 *B62D 33/06* (2006.01)
 *B62D 25/14* (2006.01)
(52) U.S. Cl.
 CPC ............ *B62D 33/0617* (2013.01); *B62D 25/14* (2013.01)
(58) Field of Classification Search
 CPC .... B62D 33/0617; B62D 25/14; B62D 11/02; B60R 16/0207; B60R 16/0215
 USPC ...................... 296/193.04, 70, 190.08, 190.01
 See application file for complete search history.

(56) References Cited

U.S. PATENT DOCUMENTS

| 5,040,990 | A | | 8/1991 | Suman et al. |
| 5,883,777 | A | * | 3/1999 | Nishitani et al. ............... 361/647 |
| 6,394,526 | B1 | * | 5/2002 | Gyllenspetz ..................... 296/70 |
| 7,604,300 | B2 | | 10/2009 | Whitfield, Jr. et al. |
| 7,970,514 | B2 | | 6/2011 | Aeberhard et al. |
| 8,550,570 | B2 | | 10/2013 | Furukawa |
| 8,672,392 | B1 | * | 3/2014 | Porcs et al. .............. 296/187.05 |
| 2001/0030435 | A1 | | 10/2001 | Burns et al. |
| 2003/0146640 | A1 | * | 8/2003 | Nakajima ........................ 296/70 |
| 2010/0084886 | A1 | * | 4/2010 | Utsugi et al. .................... 296/70 |
| 2012/0274090 | A1 | * | 11/2012 | Carter .............................. 296/70 |
| 2013/0058014 | A1 | * | 3/2013 | King, II .................... 361/679.01 |
| 2013/0126251 | A1 | | 5/2013 | Ruth |

* cited by examiner

*Primary Examiner* — Jason S Morrow
(74) *Attorney, Agent, or Firm* — Miller, Matthias & Hull LLP

(57) ABSTRACT

A cab and method for assembling such for a machine are described. The cab may define an operator compartment. The cab may comprise a cab frame, a plurality of inner surfaces disposed inside the cab frame, a wiring harness, and a plurality of interfaces accessible through the apertures of the inner surfaces. A portion of the inner surfaces may include a plurality of apertures. The plurality of interfaces may be disposed in Interactive Locations and in Hidden Locations. The plurality of interfaces may include mounting interfaces and connection interfaces. The interfaces may be pre-located. The plurality of mounting interfaces may be configured to receive and position a plurality of Customized Equipment on the inner surfaces. The plurality of connection interfaces may be configured to matingly receive electrical connectors from the Customized Equipment and to operably connect the Customized Equipment to the wiring harness.

20 Claims, 4 Drawing Sheets

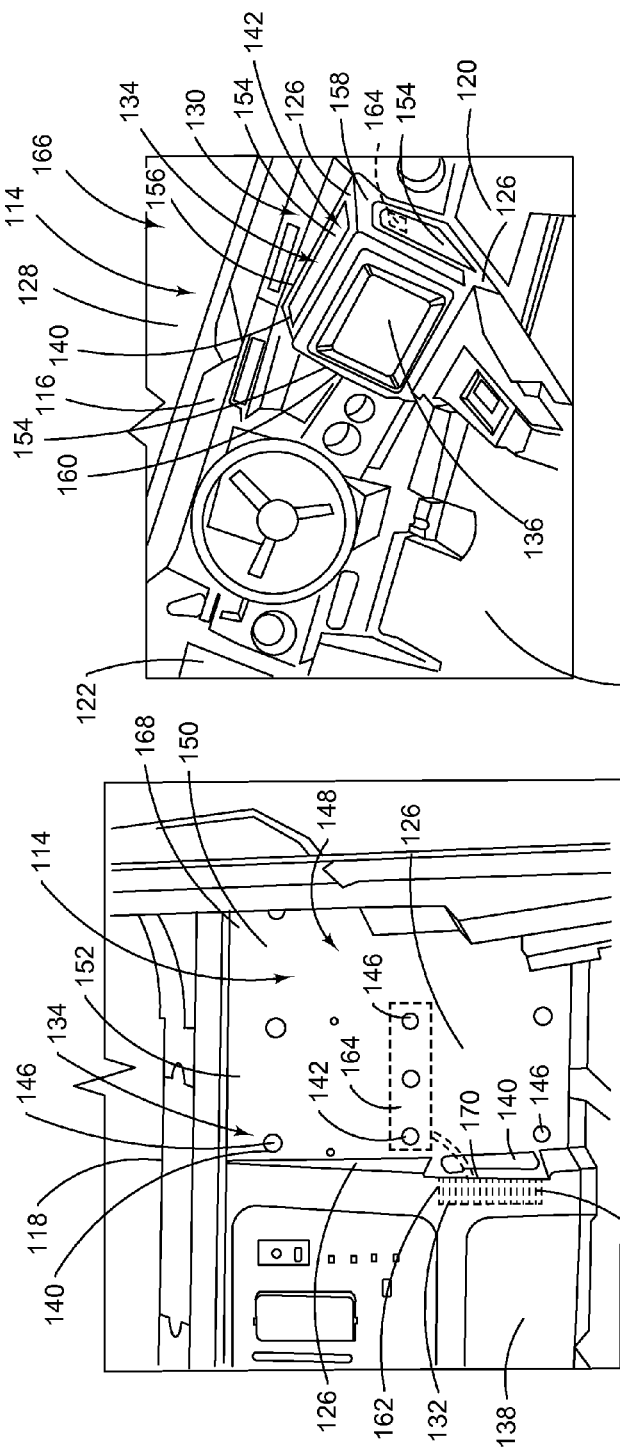
FIG. 3
FIG. 2
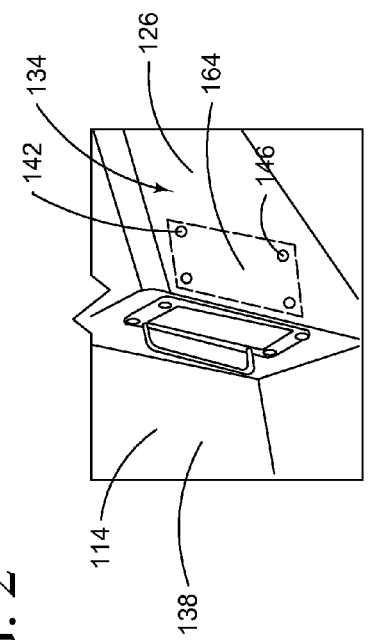
FIG. 4

PROVISIONS FOR THIRD PARTY ATTACHMENTS

TECHNICAL FIELD

The present disclosure generally relates to interiors of machine cabs and, more particularly, relates to customizable cab interiors of machines used in earth moving, construction, material handling, mining applications, and the like.

BACKGROUND

Cabs of machines used for earth moving, construction, material handling, mining, and the like, are often customized after delivery to a customer, work site or upon machine commissioning. Such customization may involve adding hardware or software systems that are not supplied by the machine manufacturer ("Customized Equipment") to the inside of the machine cab. Such Customized Equipment is typically manufactured by a third-party and may be installable in many different types of machine cabs manufactured by different companies. Examples of Customized Equipment may include dispatch systems, fatigue monitors, fire suppression systems, CB radios or the like, and other types of hardware and software.

The addition of such Customized Equipment may involve significant disassembly and reassembly of the interior of the cab and typically requires cutting the existing interior surfaces of the cab in order to mount the Customized Equipment to the cab and cutting into the existing wiring harness in order to connect the Customized Equipment to the electrical system, controller area network, or the like within the cab. Such cutting and rework may cause unintended damage to the cab interior and/or existing cab components.

U.S. Publication No. 2001/0030435 ("Burns et al.") published Oct. 18, 2001 describes a cockpit system set of interchangeable modules for a vehicle. FIG. 2 of Burns et al. illustrates an embodiment of such a system. The interchangeable modules include a driver-side module, a passenger-side module, a center module fastenable between the driver-side module and the passenger-side module, a left-hand-drive top module, and a right-hand-top module. The disclosure describes a modular system in which the proprietary modules may be interchanged in order to switch from left-hand steering to right-hand steering and vice versa. The disclosure does not address the addition/mounting of Customized Equipment, as that term is used herein, to the cockpit system. A better design is needed.

SUMMARY OF THE DISCLOSURE

In accordance with one aspect of the disclosure, a cab of a machine is disclosed. The cab may define an operator compartment. The cab may comprise a cab frame, a plurality of inner surfaces disposed inside the cab frame, a wiring harness disposed between the cab frame and at least one of the inner surfaces, and a plurality of interfaces. Each inner surface may face an interior of the operator compartment. A portion of the inner surfaces may include a plurality of apertures. The plurality of interfaces may be accessible through the apertures of the inner surfaces. The plurality of interfaces may include a plurality of mounting interfaces configured to receive and position a plurality of Customized Equipment on the inner surfaces, and a plurality of connection interfaces configured to matingly receive electrical connectors from the Customized Equipment and to operably connect the Customized Equipment to the wiring harness. A first portion of the mounting interfaces may be disposed in Interactive Locations and a second portion of the mounting interfaces may be disposed in Hidden Locations.

In accordance with another aspect of the disclosure, a method of assembling a cab of a machine is disclosed. The cab may define an operator compartment. The method may comprise providing a cab. The cab may include a cab frame, a plurality of inner surfaces disposed inside the operator compartment, a wiring harness, and a plurality of interfaces. The wiring harness may be disposed between the cab frame and at least one of the inner surfaces. Each inner surface may facing an interior of the operator compartment. A portion of the inner surfaces may include a plurality of apertures. The method may further include disposing the interfaces to be accessible through the apertures of the inner surfaces, the interfaces including a plurality of mounting interfaces and a plurality of connection interfaces, positioning a first mounting interface to extend through a first inner surface, the first mounting interface configured to receive and hold a first Customized Equipment adjacent to the first inner surface, and framing a second mounting interface with a second inner surface. The second mounting interface may be configured to receive and stabilize a position of a second Customized Equipment adjacent to the second inner surface. The plurality of connection interfaces may be configured to matingly receive electrical connectors from the first and second Customized Equipment and to operably connect the first and second Customized Equipment to the wiring harness.

In accordance with a further aspect of the disclosure, a cab of a machine is disclosed. The cab may define an operator compartment. The cab may comprise a cab frame, a plurality of inner surfaces disposed inside the cab frame, a wiring harness disposed between the cab frame and at least one of the inner surfaces, and a plurality of pre-located interfaces. Each inner surface may be facing the interior of the operator compartment. A portion of the inner surfaces may include a plurality of apertures. Each of the interfaces may be accessible through one of the apertures in the inner surfaces. A first portion of the interfaces may be disposed in Interactive Locations and a second portion of the interfaces may be disposed in Hidden Locations. The plurality of interfaces may include a plurality of threaded bosses extending through the inner surfaces and configured to receive and position Customized Equipment on the inner surfaces, a plurality of drill boards, and a plurality of connection interfaces configured to matingly receive electrical connectors from the Customized Equipment and to operably connect the Customized Equipment to the wiring harness.

BRIEF DESCRIPTION OF THE DRAWINGS

FIG. 2 is perspective view of a portion of a cab interior including exemplary mounting interfaces;

FIG. 3 is a perspective view of a portion of a cab interior including exemplary mounting interfaces;

FIG. 4 is a perspective view of a portion of a cab interior including exemplary mounting interfaces;

DETAILED DESCRIPTION

Figure 1:
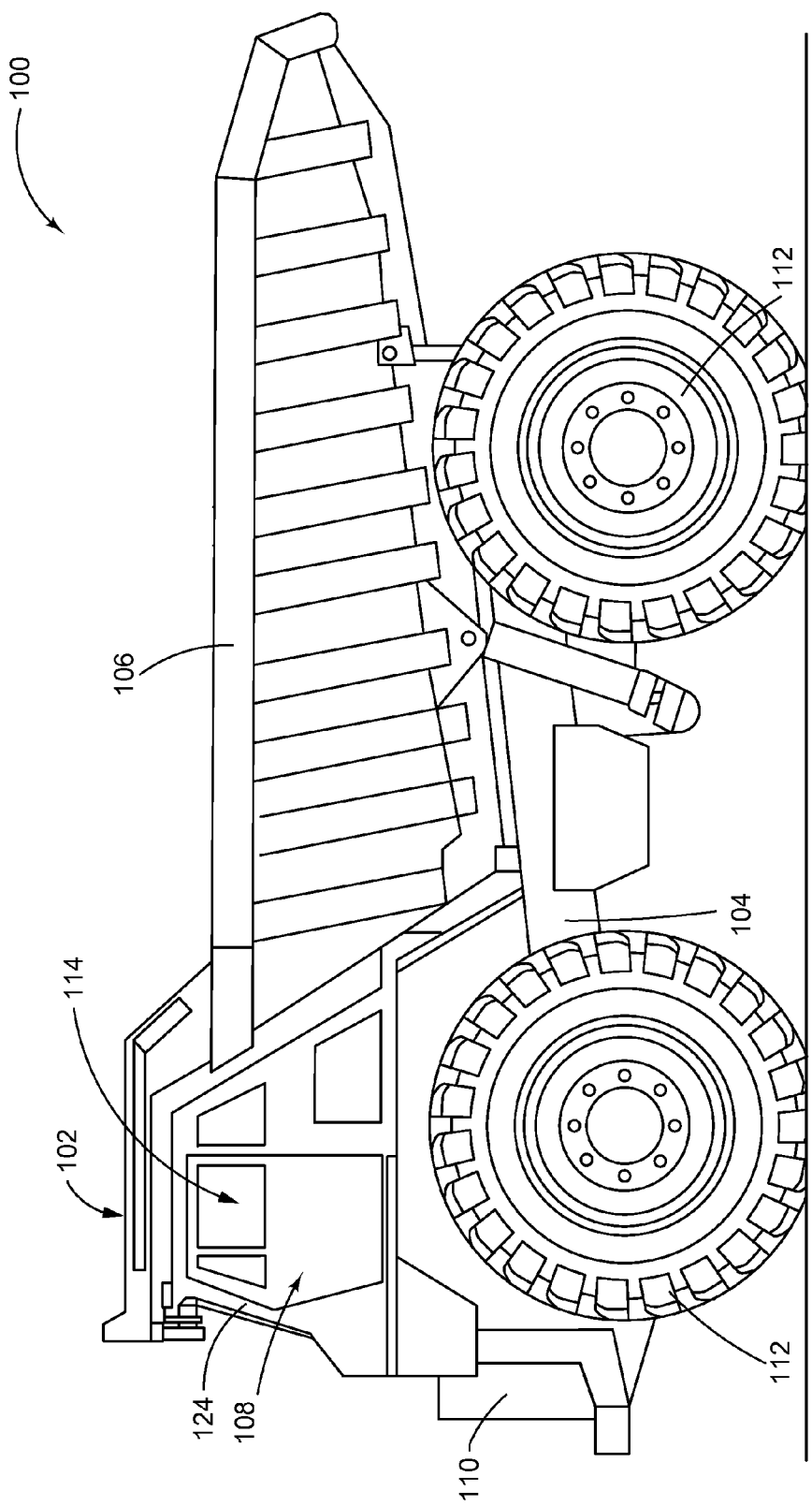
FIG. 1 is a side view of an exemplary machine.

FIG. 1 illustrates one example of a machine 100 that incorporates the features of the present disclosure. The exemplary machine 100 may be a vehicle such as a large mining truck 102. The large mining truck 102 may include a frame 104. A material carrying dump body 106 may be pivotably mounted to the frame 104. Further, a cab 108 may be mounted to the frame 104. In one embodiment, the cab 108 may be mounted to the frame 104 above an engine enclosure 110 and on a front part of the frame 104. The large mining truck 102 may be supported on the ground by a plurality of wheels 112. One or ordinary skill in the art will appreciate that one or more engines (not shown) may be housed within the engine enclosure 110. The engine may provide power to the wheels 112 and a final drive assembly, via mechanical or electric drive drain.

While the following detailed description and drawings are made with reference to a cab 108 of a large mining truck 102, the teachings of this disclosure may be employed on other earth moving, construction, material handling or mining machines.

Referring now to the drawings, and with reference to FIGS. 1-4, the cab 108 may define an operator compartment 114 having a front 116 (FIG. 3) oriented in the forward driving direction (in front of the driver), a rear 118 (behind the driver) (FIG. 2), a left side 120 (FIG. 3) and a right side 122. The cab 108 may include a cab frame 124 (FIG. 1), and a plurality of inner surfaces 126 (FIGS. 2-4) disposed inside the cab frame 124. The cab 108 may further include a front window 128 disposed in the front 116 of the cab 108 and a console 130 disposed in the operator compartment 114. The console 130 may extend from left to right across the operator compartment 114 and underneath the front window 128. The cab 108 may further include a wiring harness 132 (FIG. 5) and a plurality of interfaces 134 (FIGS. 2-5). In some embodiments, the cab 108 may further include a display 136. In the exemplary embodiment, the display 136 may be disposed in the console 130 at the front 116 of the operator compartment 114 of the cab 108. In an embodiment, the display 136 may be encased or partially encased in inner surfaces 126.

The cab frame 124 (FIG. 1) generally is the outer skeleton or weight bearing structure of the cab 108. Each inner surface 126 (FIGS. 1-4) in the cab 108 is oriented to face the interior 138 of the operator compartment 114. In an embodiment some or all of the inner surfaces 126 may be a non-metallic inner surfaces 126 shaped as a flat or contoured panel. A portion of the inner surfaces 126 may include a plurality of apertures 140 extending therethrough the inner surfaces 126. The plurality of apertures 140 may be different shapes and sizes.

The wiring harness 132 (FIG. 5) may be disposed between the cab frame 124 and at least one of the inner surfaces 126 of the operator compartment 114. The wiring harness 132 may be configured to electrically and communicatively support Customized Equipment 164 installed in the operator compartment 114.

The plurality of interfaces 134 (FIGS. 2-5) may be accessible through the apertures 140 of the inner surfaces 126 and may be configured to physically support, stabilize or mate with one or more (pieces of) Customized Equipment 164. The plurality of interfaces 134 may be "pre-located." The term pre-located meaning herein that the interfaces 134 are installed during assembly of the machine 100 prior to shipping and delivery to a customer. A portion of the interfaces 134 may be disposed in locations in the operator compartment 114 that are generally considered to be within the operator's reach and/or line of sight during operation of the machine 100 ("Interactive Locations" 166). Interfaces 134 for Customized Equipment 164 that are mounted on, through or adjacent to an inner surface 126 in the front 116, left side 120 and right side 122 of the operator compartment 114 are typically considered to be located in an Interactive Location 166 (see FIGS. 3-4). A portion of the interfaces 134 may be disposed in a location in the operator compartment 114 on, through or adjacent to the inner surfaces 126 that are disposed in the rear 118 of the operator compartment 114 (FIG. 2). Because these interfaces 134 are located in the rear 118 of the operator compartment 114 they are considered to be hidden from view and located in "Hidden Location(s)."

The plurality of interfaces 134 may include a plurality of mounting interfaces 142 and a plurality of connection interfaces 144. The mounting interfaces 142 may be configured to receive and position Customized Equipment 164 on the inner surface(s) 126 without the inner surface(s) 126 (adjacent to the mounting interfaces 142) being cut or portions of the inner surfaces 126 removed in order to mount the Customized Equipment 164. The mounting interfaces 142 may be configured to receive a wide variety of types and makes of third party Customized Equipment 164 and may be arranged to allow a wide variety of positioning of such Customized Equipment 164 installed in the operator compartment 114.

In one embodiment, the mounting interfaces 142 may include one or more bosses 146. The bosses 146 may be threaded. In some embodiments the mounting interfaces 142 may include a plurality of bosses 146 disposed on one or more inner surfaces 126 positioned in the rear 118 of the operator compartment 114 in a Hidden Location. In one embodiment, there may be nine bosses 146 positioned in a three-by-three matrix 148 on one or more inner surfaces 126 in the lower half 150 of the rear wall 152 of the operator compartment 114. In other embodiments there may be more or less bosses 146 and the positioning may be different.

In an embodiment such as that shown in FIG. 4, the mounting interfaces 142 may include a plurality of bosses 146 arranged to receive a CB radio mount configuration, or the like.

In another embodiment, the mounting interfaces 142 may include one of more drill boards 154. In one embodiment, the mounting interface 142 may be a drill board 154 disposed in the console 130 and on top 156 of a display 136. In some embodiments, the drill board 154 may be framed by the inner surface 126 similar to a picture frame. In other embodiments, the drill board 154 may be disposed in the inner surface 126 and may be flush with (level with the top of) the inner surface 126. In some embodiments, the mounting interfaces 142 may include a drill board 154 disposed on the side of the display 136. In FIG. 3, the exemplary mounting interfaces 142 include a first drill board 154 installed on the top 156 of the display 136, a second drill board 154 installed on a right side 158 of the display 136 and a third drill board 154 installed on the left side 160 of the display 136. In the exemplary embodiment, the drill boards 154 (and the Customized Equipment 164 that will be installed upon them) are located in Interactive Locations that are disposed in console 130 (near the center of the console 130) and are proximal to the driver and the steering mechanism.

Figure 5:
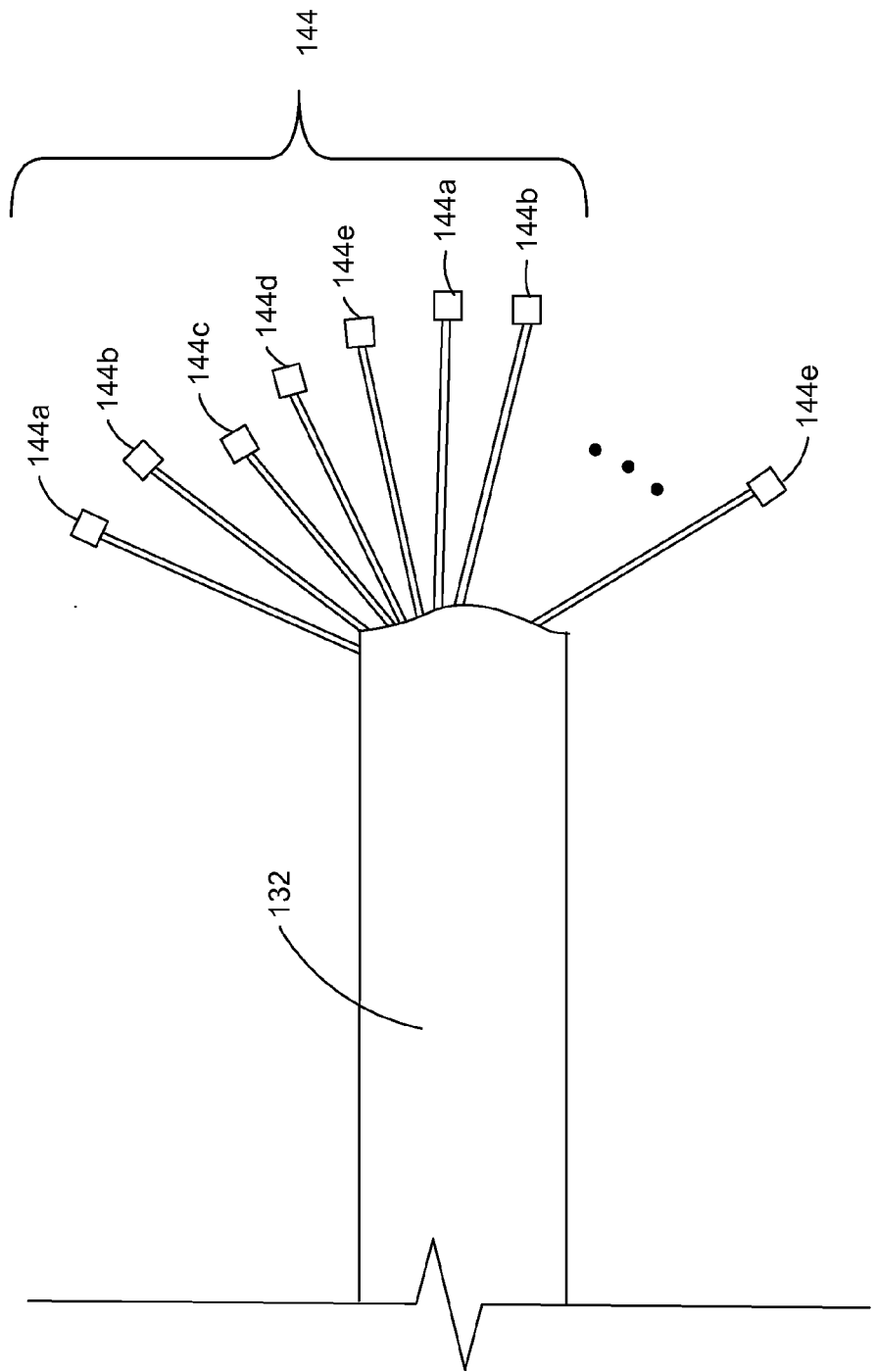
FIG. 5 is perspective view of a portion of an exemplary wiring harness including exemplary connection interfaces.

FIG. 5 illustrates an exemplary wiring harness 132 and a plurality of exemplary connection interfaces 144. The connection interfaces 144 may be configured to matingly receive or plug into the electrical connectors 170 of the Customized Equipment 164, and to operably connect the Customized Equipment 164 to the wiring harness 132 without cutting, splicing or rework of the wiring harness 132. The connection interfaces 144 may include a plurality of dedicated connections to power 144a, ground 144b, Ethernet 144c and one or more controller area networks (CAN) 144d, 144e as well as other systems 144f or networks or the like. In the exemplary embodiment illustrated in FIG. 2, the wiring harness 132 is disposed behind one or more of the inner surfaces 126 of the rear wall 152 in a pocket 162 and the connection interfaces 144 are accessed through the aperture 140.

INDUSTRIAL APPLICABILITY

Installation of third party Customized Equipment 164 often requires the inner surfaces 126 to be cut and portions to be removed so that the components can be securely mounted on supports underneath the inner surfaces 126, which may be non-metallic panels. In addition, connecting such Customized Equipment 164 to the electrical system of the cab 108 often requires cutting or splicing into the wiring harness 132. Such rework to the operator compartment 114 may be extensive and may result in unintended damage to existing components.

The mounting interfaces 142 of the present disclosure may be configured to receive and position Customized Equipment 164 on the inner surface(s) 126 without the inner surface(s) 126 (adjacent to the mounting interfaces 142) being cut or portions of the inner surfaces 126 removed to gain access to mounting supports underneath the inner surfaces 126. The mounting interfaces 142 may be configured to receive a wide variety of types and makes of third party Customized Equipment 164 and may be arranged to allow a wide variety of positioning of such Customized Equipment 164 installed in the operator compartment 114. The connection interfaces 144 allow Customized Equipment 164 to be connected to the wiring harness 132 without cutting, splicing or rework of the wiring harness 132. This allows a machine 100 owner to easily connect the Customized Equipment 164 to the wiring harness 132 without damaging the wiring harness 132 and electrical system of the cab 108.

Figure 6:
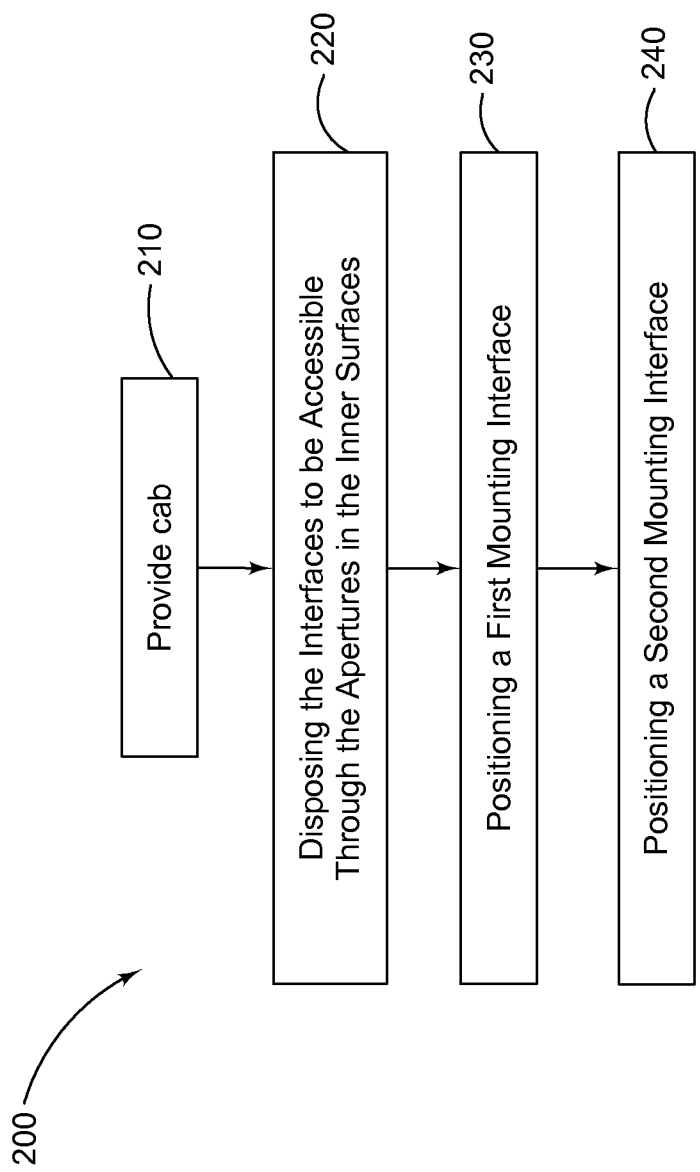
FIG. 6 is an exemplary process for of assembling a cab of a machine.

FIG. 6 illustrates an exemplary method 200 of assembling a cab 108 of a machine 100. As shown in FIG. 6, the method 200 may comprise in block 210 providing a cab 108 that includes a cab frame 124, a plurality of inner surfaces 126 disposed inside the cab frame 124, a wiring harness 132, and a plurality of interfaces 134. The wiring harness 132 may be disposed between the cab frame 124 and at least one of the inner surfaces 126. Each inner surface 126 may face the interior 138 of the operator compartment 114. Some of the inner surfaces 126 may include at least one aperture 140.

The method 200 may further include, in block 220, disposing the interfaces 134 to be accessible through the apertures 140 of the inner surfaces 126. The interfaces 134 may include a plurality of mounting interfaces 142 and a plurality of connection interfaces 144.

The method 200 may further include, in block 230, positioning a first mounting interface 142 so that the first mounting interface 142 extends through a first inner surface 126. The first mounting interface 142 may be configured to receive and hold a first piece of Customized Equipment 164 adjacent to the first inner surface 126 inside the operator compartment 114 without cutting and/or removing a portion of the first inner surface 126 adjacent to the first mounting interface 142. In an embodiment, the mounting interface 142 may be one or more bosses 146.

The method 200 may further comprise, in block 240, positioning a second mounting interface 142 adjacent to a second inner surface 126. In one embodiment, the second mounting interface 142 may be framed by a second inner surface 126 (framing the second mounting interface 142 by a second inner surface 126). The second mounting interface 142 may be configured to receive and/or stabilize the position of a second piece of Customized Equipment 164 adjacent to the second inner surface 126 inside the operator compartment 114 without cutting and permanently removing a portion of the second inner surface 126 or other inner surfaces 126. In one embodiment, the second mounting interface 142 may be a drill board 154.

In the method 200, the connection interfaces 144 may be configured to matingly receive electrical connectors 170 from the first and second pieces of Customized Equipment 164 and to operably connect the first and second pieces of Customized Equipment 164 to the wiring harness 132 without alteration to the wiring harness 132.

The features disclosed herein may be particularly beneficial to large mining trucks and other earth moving, construction, mining or material handling machines 100 that have cabs 108 in which customers desire to install Customized Equipment 164.

What is claimed is:

1. A cab of a machine, the cab defining an operator compartment, the cab comprising:
   a cab frame;
   a plurality of inner surfaces disposed inside the cab frame, each inner surface facing an interior of the operator compartment, a portion of the inner surfaces including a plurality of apertures;
   a wiring harness disposed between the cab frame and at least one of the inner surfaces; and
   a plurality of interfaces accessible through the apertures of the inner surfaces, the plurality of interfaces including:
      a plurality of mounting interfaces configured to receive and position a plurality of Customized Equipment on the inner surfaces, a first portion of the mounting interfaces disposed in Interactive Locations and a second portion of the mounting interfaces disposed in Hidden Locations; and
      a plurality of connection interfaces configured to matingly receive electrical connectors from the Customized Equipment and to operably connect the Customized Equipment to the wiring harness.

2. The cab of claim 1, wherein the plurality of interfaces are pre-located.

3. The cab of claim 1, wherein the second portion of the mounting interfaces includes a plurality of bosses.

4. The cab of claim 1, wherein at least one of the mounting interfaces is a drill board.

5. The cab of claim 1, further including a display, wherein the first portion of the mounting interfaces includes a plurality of drill boards.

6. The cab of claim 5, wherein a first drill board is disposed above the display.

7. The cab of claim 5, wherein a first drill board is disposed on a side of the display.

8. The cab of claim 1, wherein the connection interfaces include connection interfaces selected from the group consisting of power, ground, ethernet, and controller area network connection interfaces.

9. A method of assembling a cab of a machine, the cab defining an operator compartment, the method comprising:
   providing a cab that includes a cab frame, a plurality of inner surfaces disposed inside the operator compartment, a wiring harness, and a plurality of interfaces, the wiring harness disposed between the cab frame and at least one of the inner surfaces, each inner surface facing an interior of the operator compartment, a portion of the inner surfaces including a plurality of apertures;

disposing the interfaces to be accessible through the apertures of the inner surfaces, the interfaces including a plurality of mounting interfaces and a plurality of connection interfaces;

positioning a first mounting interface to extend through a first inner surface, the first mounting interface configured to receive and hold a first Customized Equipment adjacent to the first inner surface; and framing a second mounting interface with a second inner surface, the second mounting interface configured to receive and stabilize a position of a second Customized Equipment adjacent to the second inner surface, wherein the plurality of connection interfaces are configured to matingly receive electrical connectors from the first and second Customized Equipment and to operably connect the first and second Customized Equipment to the wiring harness.

10. The method of claim 9, wherein the first mounting interface is a drill board or a boss.

11. A cab of a machine, the cab defining an operator compartment, the cab comprising:

a cab frame;

a plurality of inner surfaces disposed inside the cab frame, each inner surface facing the interior of the operator compartment, a portion of the inner surfaces including a plurality of apertures;

a wiring harness disposed between the cab frame and at least one of the inner surfaces; and a plurality of pre-located interfaces, each of the interfaces accessible through one of the apertures in the inner surfaces, a first portion of the interfaces disposed in Interactive Locations and a second portion of the interfaces disposed in Hidden Locations, the plurality of interfaces including:

a plurality of threaded bosses extending through the inner surfaces and configured to receive and position Customized Equipment on the inner surfaces;

a plurality of drill boards; and a plurality of connection interfaces configured to matingly receive electrical connectors from the Customized Equipment and to operably connect the Customized Equipment to the wiring harness.

12. The cab of claim 11, wherein at least one of the threaded bosses extends through one of the inner surfaces disposed in one of the Hidden Locations.

13. The cab of claim 11, wherein some of the threaded bosses are arranged to provide a CB radio mount.

14. The cab of claim 11 further including a display, wherein a first drill board is disposed on top of the display and is framed by a first inner surface.

15. The cab of claim 11 further including a display partially encased in inner surfaces, wherein a first drill board is disposed on a first side of the display and a second drill board is disposed on a second side of the display.

16. The cab of claim 11 further including a front window and a console extending from left to right under the front window, wherein a first drill board is disposed proximal to a center of the console.

17. The cab of claim 11 further including a display, wherein a first drill board is disposed on a side of the display in one of the Interactive Locations.

18. The cab of claim 11, wherein the connection interfaces include connections interfaces selected from the group consisting of power, ground, ethernet, and controller area network connection interfaces.

19. The cab of claim 11, wherein the machine is a mining truck.

20. The cab of claim 11, wherein the plurality of inner surfaces are non-metallic.

\* \* \* \* \*